UNITED STATES PATENT OFFICE.

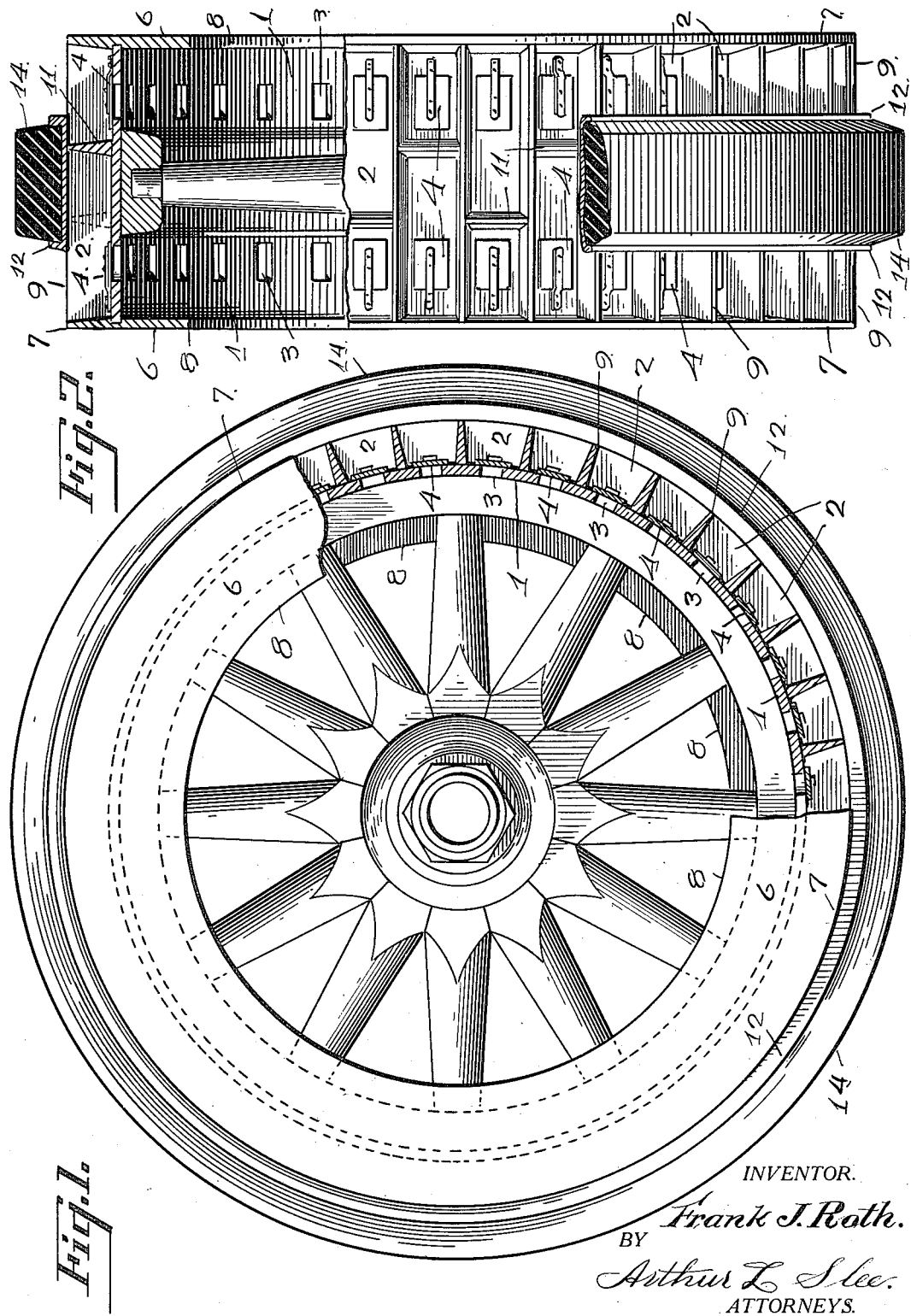

FRANK J. ROTH, OF SAN FRANCISCO, CALIFORNIA.

TRACTOR-WHEEL.

1,268,493. Specification of Letters Patent. Patented June 4, 1918.

Application filed June 25, 1917. Serial No. 178,274.

*To all whom it may concern:*

Be it known that I, FRANK J. ROTH, a citizen of the United States, residing in the city and county of San Francisco and State of California, have invented a new and useful Improvement in Tractor-Wheels, of which the following is a specification.

My invention relates to tractor wheels wherein a series of pockets arranged on the periphery of the wheel operate in conjunction with valves to admit air to said pockets under certain conditions; and the objects of my invention are First, to provide an improved tractor wheel;

Second, to provide an improved tractor wheel having means adapted to prevent the said wheel from sinking deeply into marshy or muddy ground;

Third, to provide an improved tractor wheel of the character described having a series of pockets on the periphery thereof to retain atmosphere to prevent the entrance of mud to said pockets; and Fourth, to provide an improved device having means adapted to permit the passage of air into the pockets from the inner side of the wheel to release the suction produced on said pocket when being withdrawn from mud or the like by the rotation of said wheel.

I accomplish these several objects by means of the device disclosed in the drawings forming a part of the present specification wherein like characters of reference are used to designate similar parts throughout the said specification and drawings, and in which—

Figure 1 is a front elevation of my improved tractor wheel partly broken to disclose the arrangement of the pockets and the valves for permitting the passage of air to said pockets; and Fig. 2 is a partly broken side elevation of Fig. 1.

Referring to the drawings the numeral 1 is used to designate a suitable rim having a series of lateral pockets 2 arranged in pairs around the periphery of said rim 1.

A series of apertures 3, one for each pocket 2, are provided within the rim 1, each aperture 3 being covered by a spring controlled valve 4 arranged to permit the passage of air to the pockets 2 from the interior side of the rim 1 only, the purpose of which will hereinafter be more fully described.

The pockets 2 are formed preferably of side plates 6 whose outer edges 7 and inner edges 8 extend beyond and inside respectively, of the rim 1, thereby forming interior and exterior annular channels.

The exterior channel is provided with a series of lateral partitions 9, while a second series of circumferentially arranged staggered partitions 11 are arranged between the partitions 9 thereby forming the pairs of pockets 2.

A suitable rim or channel 12 is detachably mounted around and upon the outer edges of the lateral partitions 9 and is provided with preferably a solid rubber tire 14 to support the wheel under ordinary conditions.

The operation is as follows:

When the wheel is running in mud or over wet marshy ground the solid tire 14 will of course sink into said ground or mud and the pressure of the load upon the wheel will have a tendency to force the mud into the pockets 2. But as the pockets are air tight the mud will imprison the air within said pockets and compress said air until said air pressure is slightly greater than the pressure of the wheel on the mud.

It is evident, then, that the edges of the lateral partitions 9 will be partially embedded within the mud and consequently serve as a tractive agency to prevent the wheel from slipping.

As each pocket is withdrawn from the mud by the rotation of the wheel the mud within the pocket will produce a suction that will tend to hold the wheel into the mud. But as the valves 4 permit the passage of air from the interior of the wheel to the pockets this suction is released by said admission or passage of air and consequently the mud is readily and easily released from the pockets 2.

It is evident that several adjacent pockets will be submerged simultaneously and as one pocket is being withdrawn from the mud by the rotation of the wheel other pockets are entering and engaging the mud on the opposite side of the wheel.

The inwardly extending flanges or edges 8 of the side plates 6 extend inwardly a sufficient extent to prevent the mud and water from flowing onto the inner sides of the valves 4.

It is evident from the foregoing that I have provided an improved tractor wheel having means adapted to prevent the sinking of said wheel into mud and marshy ground as well as improved means for providing traction for said wheel.

Having thus described my invention what I claim as new and desire to secure by Letters Patent is—

1. A tractor wheel comprising a suitable rim; a series of lateral pockets arranged around the periphery of the rim; and a suitable valve within each pocket to admit atmosphere to said pocket from the interior of the rim only.

2. A tractor wheel comprising a suitable rim; a series of lateral pockets arranged in pairs around the periphery of the rim; and a suitable valve within each pocket to admit atmosphere into said pocket from the interior of the rim only.

3. A tractor wheel comprising a suitable rim; a series of air-tight pockets arranged around the rim to retain air and tend to thereby prevent mud from entering said pockets when said wheel is running through mud; and means within each pocket for admitting air to the pocket to facilitate the releasing of the mud therefrom when said pocket is being pulled from the mud by the rotation of the wheel.

4. A tractor wheel comprising a suitable rim; a series of air-tight pockets arranged around the rim to retain air and tend to thereby prevent mud from entering said pockets when said wheel is running through mud; means within each pocket for admitting air to the pocket to facilitate the releasing of the mud therefrom when said pocket is being pulled from the mud by the rotation of the wheel; and a solid rubber tire mounted upon the rim and beyond the pockets.

5. A tractor wheel comprising a suitable rim; a series of lateral pockets arranged around the periphery of the rim to retain air and thereby tend to prevent mud from entering said pockets when the wheel is running through mud; a suitable valve within each pocket to admit air to said pocket from the interior of the rim only to facilitate the releasing of the mud from the pocket during the rotation of the wheel; and a pair of side plates arranged on the sides of the pockets and rim and extending inwardly from the rim to prevent the entrance of mud to the pockets through the valves when said pockets are submerged.

In witness whereof I hereunto set my signature.

FRANK J. ROTH.